United States Patent [19]
Sjoman

[11] 3,768,802
[45] Oct. 30, 1973

[54] CARD FEEDER FOR FOLDING MACHINE
[75] Inventor: Carl F. Sjoman, Los Angeles, Calif.
[73] Assignee: Team Industries, Los Angeles, Calif.
[22] Filed: Jan. 24, 1972
[21] Appl. No.: 220,138

Related U.S. Application Data
[63] Continuation-in-part of Ser. No. 68,930, Sept. 2, 1970.

[52] U.S. Cl.............. 271/12, 271/99, 271/132, 271/141
[51] Int. Cl............. B65h 3/22, B65h 5/02
[58] Field of Search .............. 271/44 A, 44 SP, 271/44 PT, 44 PP, 44 FB, 44 R, 32, 12

[56] References Cited
UNITED STATES PATENTS
| | | | |
|---|---|---|---|
| 1,174,984 | 3/1916 | Huneke | 271/44 A |
| 3,019,017 | 1/1962 | Brownsey | 271/44 R |
| 1,665,937 | 4/1928 | Smith | 271/44 A |

Primary Examiner—Evon C. Blunk
Assistant Examiner—James W. Miller
Attorney—Ford W. Harris, Jr. et al.

[57] ABSTRACT

An apparatus for supplying chip board cards to a machine for folding T-shirts therearound. A carriage removes the cards one at a time from the bottom of a stack in a magazine and feeds them to a conveyor system which delivers them to the folder. The carriage is provided with inclined pins which partially penetrate the lowermost card to grip it, and is also provided with a vacuum hold down for seating the lowermost card on the carriage even if the card is warped.

3 Claims, 8 Drawing Figures

Patented Oct. 30, 1973
3,768,802
2 Sheets-Sheet 1
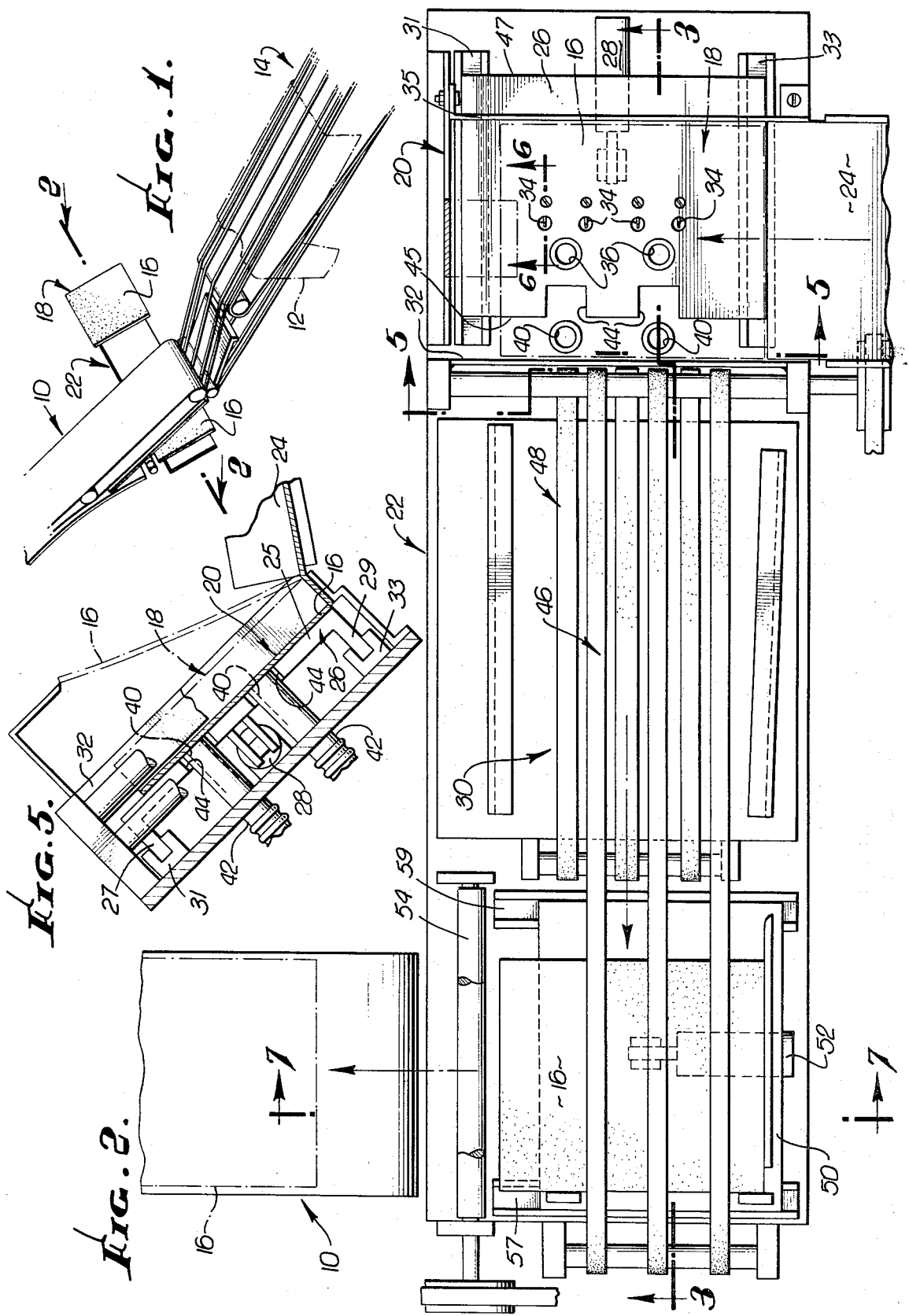

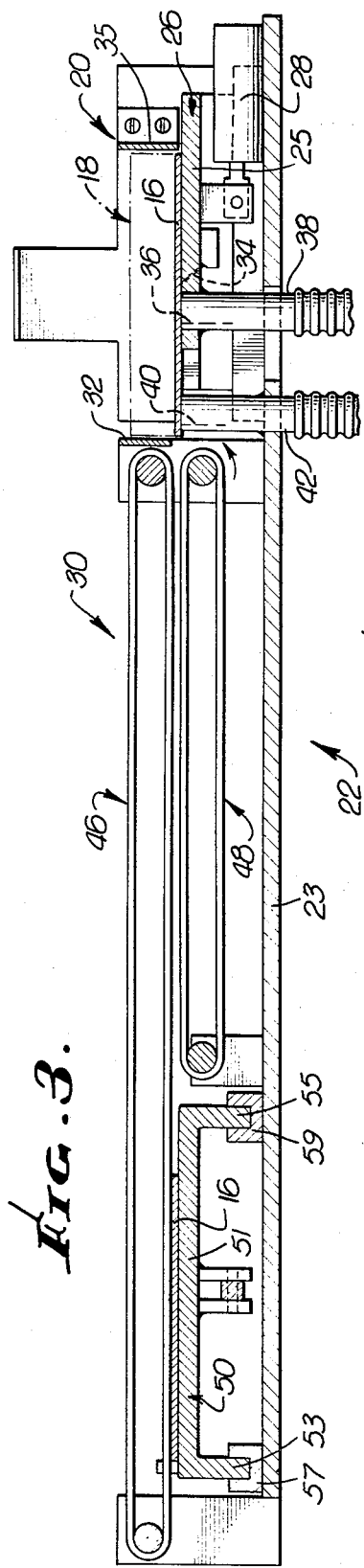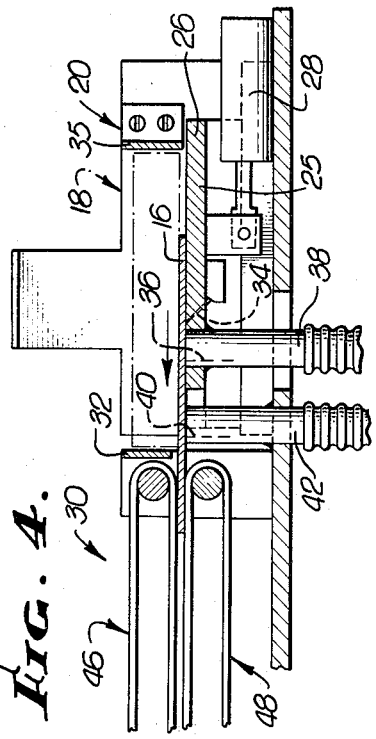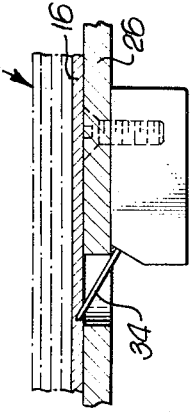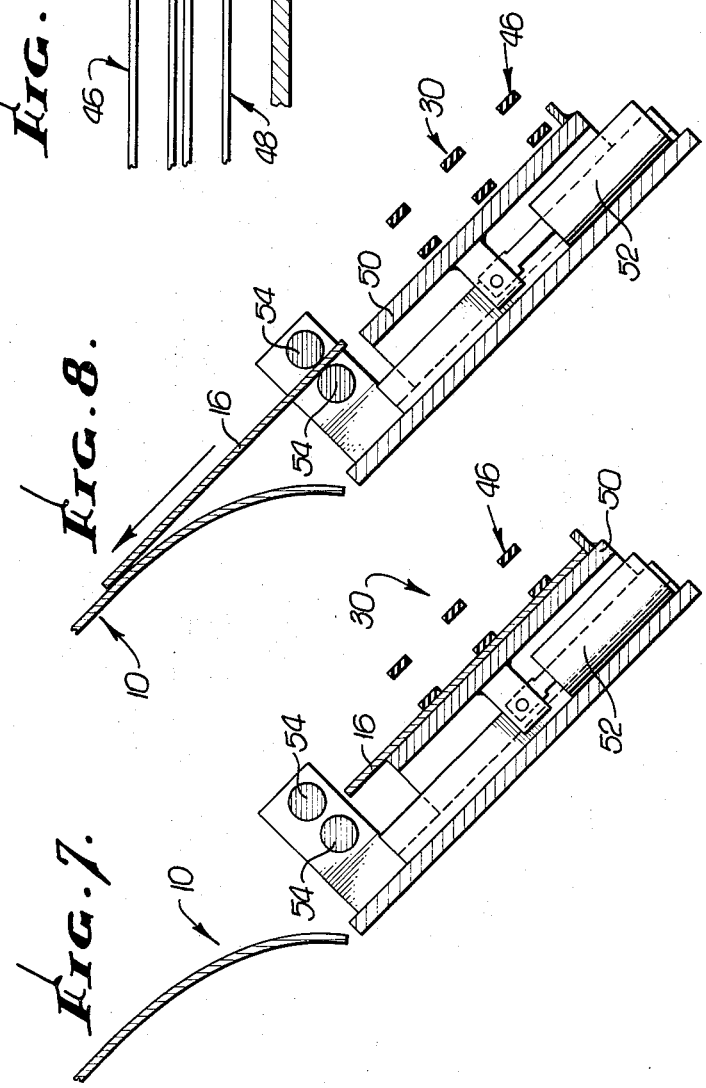

CARD FEEDER FOR FOLDING MACHINE

CROSS REFERENCE TO RELATED APPLICATION

This application is a continuation-in-part of Ser. No. 68,930, entitled "Apparatus For Folding T-Shirts," filed Sept. 2, 1970 by Clyde R. Wilson, John L. Montoya, Casper L. Bullett, and me.

BACKGROUND OF INVENTION

The present invention relates in general to an apparatus for feeding articles one at a time from the bottom of a stack of such articles to another apparatus in which the articles are used or processed.

More particularly, the invention relates to an apparatus for supplying cards of chip board, or other, similarly inexpensive material, to a machine for folding T-shirts around the cards, such a machine being disclosed and claimed in the aforementioned co-pending application of which this is a continuation-in-part.

Cards of chip board, or the like, are difficult to feed from a stack one at a time, particularly from the bottom of the stack, because they are relatively soft, with soft edges, may not be of uniform consistency, may be warped, and the like.

SUMMARY AND OBJECTS OF INVENTION

The primary object of the invention is to provide an apparatus for feeding cards of chip board, or the like, to a folding machine, or other apparatus, in a positive and reliable manner, despite deficiencies in the cards of the nature hereinabove set forth.

More particularly, the invention may be summarized as comprising, and an object of the invention is to provide an apparatus which comprises: a magazine for a stack of cards; a carriage forming a lower wall of the magazine and on which the lowermost card in the stack rests, the carriage being movable laterally relative to the remainder of the magazine to a card discharging position; card gripping means on the carriage for displacing the lowermost card in the stack laterally relatively to the remainder of the stack as the carriage is moved to the card discharging position; and means for delivering a card on the carriage to a folding machine, or other apparatus, when the carriage is at its card discharging position.

An important object of the invention is to provide a card gripping means which engages each card in a positive and reliable manner despite the basic nature of the material involved, warping of the card, and the like.

More particularly, an important object of the invention is to provide a card gripping means which includes pins on the carriage and engageable with the lowermost card in the stack, the pins projecting from the carriage a distance less than the thickness of one of the cards so that they do not penetrate more than the lowermost card, and the pins being inclined upwardly in the direction of movement of the carriage toward its card discharging position so that the lowermost card is propelled in a positive manner and can readily be stripped from the pins.

Still more particularly, an important object is to provide a card gripping means which includes vacuum means on the carriage and engageable with the lowermost card in the stack for flattening the card against the carriage even if the card is warped, thereby insuring proper engagement of the card by the pins on the carriage.

Yet another object is to provide another vacuum means between the carriage and a conveyor means for delivering the card to the folding machine, this second vacuum means serving to insert the card into the conveyor means properly even if the card is warped.

The foregoing objects, advantages, features and results of the present invention, together with various other objects, advantages, features and results which will be evident to those skilled in the art to which the invention relates in the light of this disclosure, may be achieved with the exemplary embodiment of the invention illustrated in the accompanying drawings and described in detail hereinafter.

DESCRIPTION OF DRAWINGS

In the drawings:

FIG. 1 is a fragmentary perspective view on a reduced scale showing an apparatus of the invention for supplying chip board cards to a machine for folding T-shirts therearound;

FIG. 2 is a sectional view taken as indicated by the arrowed line 2—2 of FIG. 1;

FIG. 3 is a sectional view taken as indicated by the arrowed line 3—3 of FIG. 2;

FIG. 4 is a view similar to the right end of FIG. 3, but showing a card carriage of the apparatus of the invention in a card discharging position;

FIGS. 5, 6 and 7 are sectional views respectively taken along the arrowed lines 5—5, 6—6 and 7—7 of FIG. 2; and FIG. 8 is a view similar to FIG. 7, but showing a card delivered to the folding machine.

DETAILED DESCRIPTION OF EXEMPLARY EMBODIMENT OF INVENTION

Referring initially to FIG. 1 of the drawings, illustrated fragmentarily therein is a T-shirt folding machine or folder 10 to the inlet end of which T-shirts 12 are delivered seriatim by an apparatus 14. As disclosed in the aforementioned co-pending application, the T-shirts 12 are folded around cards 16, of chip board, or similar materials, by the folding machine 10.

As best shown in FIGS. 2 to 5, a stack 18 of the cards 16 is stored in a magazine 20. As will be described in detail hereinafter, the lowermost card 16 in the stack 18 is delivered to the folder 10 by an apparatus 22 of the invention. Additional cards 16 may be stored in a rack 24, FIG., 5, which slopes downwardly toward and communicates with the magazine 20. As cards 16 are successively removed from the bottom of the stack 18, additional cards in the rack 24 fall into the magazine 20 on top of the stack 18.

A card carriage 26 connected to a frame 23 constitutes the lower wall of the magazine 20 and supports the stack 18. The carriage includes a flat member 25 and two depending side portions 27, 29. The carriage 26 is reciprocable transversely of the folder 10 between a retracted position, FIG. 3, and a card discharging position, FIG. 4. This reciprocatory motion of the carriage 26 is produced by a reciprocatory motor 28 connected to the carriage, such motor being an air cylinder, for example. The side portions 27, 29 are received and guided by two oppositely positioned and spaced apart channels 31, 33, respectively.

Each time the carriage 26 is displaced to the left, as viewed in FIGS. 3 and 4 of the drawings, the lowermost card 16 in the stack 18 is discharged into a conveyor means 30, as shown in FIG. 4, which delivers it to the folding machine 10 in a manner to be described hereinafter. The magazine 20 is provided with a side wall 32 under which the lowermost card 16 passes, the cards in the stack 18 above the lowermost being restrained by the side wall 32 while in returning to the FIG. 3 position, the cards are restrained by an oppositely positioned side wall 35.

The carriage 26 is provided with means for gripping the lowermost card 16 in a positive and reliable manner, as will now be described. More particularly, mounted on the carriage 26 are pins 34 which project upwardly through openings in the carriage. The pins 34 project upwardly above the carriage 26 a distance less than the thickness of one of the cards 16. Consequently, the pins 34 only partially penetrate the lowermost card 16, thereby insuring that only the lowermost card is delivered to the conveyor means 30 by the carriage 26. The pins 34 are inclined upwardly in the direction of movement of carriage 26 toward its card discharging position of FIG. 4, this being best shown in FIG. 6. Consequently, the pins 34 propel the lowermost card 16 in a positive manner and penetrate it automatically in response to motion of the carriage 26 toward its card discharging position. Further, this inclination of the pins 34 enables the conveyor means 30 to strip the lowermost card 16 in the stack 18 from the carriage 26 easily as soon as the leading edge of the lowermost card is engaged by the conveyor means 30, as shown in FIG. 4.

To insure that the lowermost card 16 in the stack 18 will be delivered to the conveyor means 30 properly even though the cards may be warped, the card delivering apparatus 22 includes a vacuum hold down which acts on the lowermost card and flattens it if it is warped. More particularly, this vacuum hold down or hold down means includes a set of two vacuum ports 36 in the carriage 26 and movable therewith adjacent the edge thereof closest to the conveyor means 30. The positions of the vacuum ports 36 are best shown in FIG. 2. The vacuum ports 36 communicate with vacuum lines 38 leading to a suitable vacuum source, not shown, so as to communicate a reduced pressure (relative atmospheric pressure) to the lowermost card 16. This reduced pressure establishes a pressure differential on the lowermost card causing the lowermost card to be flattened.

The vacuum hold down means also includes two stationary vacuum ports 40 having vacuum lines 42 connected thereto. The vacuum ports 40 are aligned with the vacuum ports 36 in the direction of carriage movement, and are disposed immediately adjacent the inlet end of the conveyor means 30. Notches 44 in the leading edge 45 of the carriage 26 permit movement of the carriage to its card discharging position despite the presence of the vacuum ports 40 and their vacuum lines 42. As will be apparent, the stationary vacuum ports 40 insure aligning the leading edge of the lowermost card 16 in the stack 18 with the inlet end of the conveyor means 30 even though the card is warped in this region. The trailing edge 47 of the carriage 26 is straight.

The vacuum hold down system, comprising the vacuum ports 36 and 40, and the inclined pins 34 cooperate to insure positive and reliable delivery of the lowermost card 16 in the stack 18 to the inlet end of the conveyor means 30, which is an important feature of the invention.

The conveyor means 30 comprises belt-type upper and lower conveyors 46 and 48 which are driven in any suitable manner and between which the leading edge of the lowermost card 16 in the stack 18 is inserted by the carriage 26, as shown in FIG. 4. The conveyors 46 and 48 deliver the card 16 to another carriage 50 aligned with the folding machine 10 and reciprocable transversely of the conveyor means 30 toward and away from the inlet end of the folding machine. The carriage 50 includes a flat member 51 and depending side portions 53, 55 which are received by two spaced apart channels 57, 59, respectively, in a manner like that described for the carriage 26. The carriage is actuated by a reciprocatory motor 52, FIGS. 7 and 8, which motor may be an air cylinder. As will be apparent from FIGS. 7 and 8, movement of the carriage 50 toward the inlet end of the folder 10 delivers the card 16 on this carriage between two inlet rolls 54 of the folder 10. The carriage 50 delivers the card 16 to the inlet rolls 54 in timed relation with the delivery of a T-shirt 12 to the inlet end of the folding machine, as more fully discussed in the aforementioned co-pending application.

Although an exemplary embodiment of the invention has been disclosed for purposes of illustration, it will be understood that various changes, modifications and substitutions may be incorporated in such embodiment without departing from the spirit of the inventon as defined by the claims appearing hereinafter.

I claim as my invention:

1. An apparatus for supplying cards seriatim to a machine for folding articles therearound, the combination of:

a frame attachable to a machine for folding articles;

a magazine connected to said frame, said magazine for storing a stack of cards to be supplied to said machine;

a first carriage mounted to said frame and reciprocally movable relative thereto between first and second position, said first carriage comprising a flat member having a notched leading edge and a straight trailing edge and depending side portions whereby said flat member supports said stack of cards;

a first wall connected to said frame for forming a portion of said magazine positioned adjacent said trailing edge of said carriage when said carriage is in its first position;

a second wall connected to said frame opposite to and spaced apart from said first wall and positioned adjacent to and at a predetermined spacing from said leading edge of said carriage when said carriage is in its second position;

a first pair of spaced apart channels connected to said frame for receiving and guiding said depending side portions of said first carriage when said first carriage moves between its first and second positions;

a rack connected to said magazine position to direct additional cards toward said flat member of said first carriage;

a plurality of pins connected to said flat member of said first carriage projecting at an incline to said flat member in the direction of movement of said first carriage through a corresponding plurality of openings in said flat member, said pins for engaging the lowermost card in said stack for a distance through said card less than the thickness of said card;

a first set of vacuum ports in said first carriage and movable therewith, said ports for communicating a reduced pressure to said lowermost card whereby a continuous pressure differential is created on said lowermost card until said lowermost card is discharged by said first carriage;

a second set of vacuum ports in said frame stationary relative said first carriage, said second set of ports positioned to be received by said notches of said leading edge of said first carriage, and for communicating a reduced pressure to said lowermost card whereby a continuous pressure differential is created on said lowermost card until said lowermost card is discharged by said first carriage;

conveyor means connected to said frame having a first end for removing said lowermost card from said first carriage and a second end for depositing said card on a second carriage;

a second carriage mounted to said frame and reciprocally movable relative thereto between first and second positions, said second carriage comprising a flat member with depending side portions;

a second pair of spaced apart channels connected to said frame for receiving and guiding said depending side portions of said second carriage when said carriage moves between its first and second positions, said second carriage receiving said card from said conveyor means when in said first position and discharging said card when in said second position; and a set of rolls connected to said frame positioned to receive said card from said second carriage when said carriage is in its second position.

2. An apparatus as claimed in claim 1 wherein the direction of reciprocal movement of said second carriage is perpendicular to the direction of reciprocal movement of said first carriage.

3. An apparatus as claimed in claim 2 including a first air cylinder connected to said frame and said first carriage for reciprocating said first carriage; and a second air cylinder connected to said frame and said second carriage for reciprocating said second carriage;

and wherein said plurality of pins comprise four aligned pins;

said first set of vacuum ports comprise two ports; and said second set of vacuum ports comprise two ports, said first set and said second set of vacuum ports being aligned.

* * * * *